US009111055B2

(12) United States Patent
Kayton et al.

(10) Patent No.: US 9,111,055 B2
(45) Date of Patent: Aug. 18, 2015

(54) VIRTUAL MASS EMULATOR

(76) Inventors: Bradley Kayton, Hollis, NH (US); Jon Rappaport, Mathews, NC (US); Jacob Stuart Michael Beal, Somerville, MA (US); Vinayak V. Ranade, Somerville, MA (US); Bradley D. LaRonde, Pennellville, NY (US)

( * ) Notice: Subject to any disclaimer, the term of this patent is extended or adjusted under 35 U.S.C. 154(b) by 450 days.

(21) Appl. No.: 13/529,260

(22) Filed: Jun. 21, 2012

(65) Prior Publication Data

US 2013/0173243 A1 Jul. 4, 2013

Related U.S. Application Data

(60) Provisional application No. 61/499,564, filed on Jun. 21, 2011.

(51) Int. Cl.
*G06F 17/50* (2006.01)
*G06Q 10/00* (2012.01)
*G08C 15/00* (2006.01)

(52) U.S. Cl.
CPC ............ *G06F 17/5009* (2013.01); *G06Q 10/00* (2013.01); *G08C 15/00* (2013.01); *G06F 2217/78* (2013.01); *Y02E 60/76* (2013.01); *Y04S 40/22* (2013.01)

(58) Field of Classification Search
CPC ....... Y04S 20/222; Y04S 40/22; G08C 15/00; G06F 1/26; G06Q 10/00; G06Q 30/00
USPC ..................................................... 703/13, 23
See application file for complete search history.

(56) References Cited

U.S. PATENT DOCUMENTS

| | | |
|---|---|---|
| 5,819,063 A | 10/1998 | Dahl et al. |
| 7,698,121 B2 | 4/2010 | Steenkiste et al. |
| 7,945,436 B2 | 5/2011 | Ang et al. |
| 2005/0216920 A1 | 9/2005 | Tewari et al. |
| 2006/0167667 A1 | 7/2006 | Maturana et al. |
| 2009/0326726 A1* | 12/2009 | Ippolito et al. ................ 700/291 |
| 2010/0060479 A1* | 3/2010 | Salter ........................ 340/870.4 |
| 2010/0138363 A1 | 6/2010 | Batterberry et al. |
| 2010/0179704 A1* | 7/2010 | Ozog ............................ 700/291 |
| 2010/0198713 A1* | 8/2010 | Forbes et al. ................... 705/34 |
| 2010/0332373 A1* | 12/2010 | Crabtree et al. ................ 705/37 |

(Continued)

OTHER PUBLICATIONS

Jin et al., Design and Implementation of a Smart Home Networking Simulation, Carleton University, Systems and Computer Engineering, Technical Report SCE-10-05, Aug. 2010.*

(Continued)

*Primary Examiner* — Kandasamy Thangavelu

(57) ABSTRACT

The present invention is directed to a system and method for emulating smart grid devices in a smart grid for demand-response program analysis and optimization. Smart grid devices may be emulated in a virtual environment on a server, and can also be emulated individually on smart grid devices themselves. Demand-response programs can be simulated in a virtual environment with virtual emulated smart grid devices, or they can be simulated in a hybrid real-virtual environment with both real smart grid devices and virtual emulated smart grid devices. Demand-response programs can be simulated serially or in parallel. Additionally, such hybrid demand-response program simulations can be enhanced and optimized by including data obtained from the real smart grid devices into the simulation feed-back loop.

23 Claims, 9 Drawing Sheets

(56) References Cited

U.S. PATENT DOCUMENTS

2011/0270452 A1* 11/2011 Lu et al. .................. 700/291
2012/0109719 A1    5/2012 Parmar et al.

OTHER PUBLICATIONS

Jin, A Smart Home Networking Simulation for Energy Saving, Master's Thesis, OCIECE, Jan. 2011.*

* cited by examiner

VIRTUAL MASS EMULATOR

CROSS-REFERENCE TO RELATED APPLICATIONS

The present application is a continuation application of U.S. provisional patent application Ser. No. 61/499,564, filed Jun. 21, 2011, for Virtual Mass Emulator, by Bradley Kayton and Jon Rappaport, included by reference herein and for which benefit of the priority date is hereby claimed.

FEDERALLY SPONSORED RESEARCH

Not applicable.

SEQUENCE LISTING OR PROGRAM

Not applicable.

FIELD OF INVENTION

The present invention relates to electrical energy systems and, more particularly, to smart electrical grids.

BACKGROUND OF THE INVENTION

Existing energy systems are plagued by high variability in demand for power and the lack of effective control over the demand. For example, peak electrical consumption (in terms of wattage) is much higher than average consumption, but the total duration of peak consumption is relatively short. It can be costly to maintain the surge capacity that is only needed during peak consumption periods. As a result, utility companies often impose brown-outs and/or black-outs when capacity is insufficient. This practice has many negative impacts on the residents and businesses in the service area.

Some research has been done in recent years to develop more cost effective and less intrusive methods for easing the strains on existing energy systems. For example, studies have shown that there is a high level of flexibility in actual consumer requirements, and therefore it is possible in theory to reduce peak consumption without depriving consumers of energy they are unwilling to give up.

One conventional approach is to encourage consumers to conserve energy voluntarily by increasing their awareness of energy consumption. For example, studies have shown that information about energy consumption of consumers relative to their neighbors can cause high consumers to dramatically reduce their consumption. Also, studies conducted in California showed that consumers given a "mood ring" that indicates in real time the stress on the power grid dramatically reduced their peak-time consumption.

Another conventional approach is to use energy pricing, either in real or virtual currency, to gauge each consumer's willingness to reduce consumption. In these so-called market-based systems, the price of energy is allowed to fluctuate in real time based on actual demand, which provides an economic incentive for consumers to reduce consumption when the actual demand is high. The rationale behind these systems is that the price a consumer is willing to pay for energy is inversely related to the consumer's willingness to reduce energy consumption, so that a consumer who is more willing to reduce energy consumption will do so at a lower price point compared to another consumer who is less willing to reduce energy consumption. Thus, as the market finds equilibrium, the system approaches a desired state where each consumer reduces energy consumption only to the extent he is willing.

Conventional systems have also been developed to control energy demand related to heating and/or cooling in a building. Typically, these systems employ a centralized architecture where a central controller collects information from various sources and provides control signals to heating and/or cooling units based on the collected information.

New methods of demand-response management are desirable to overcome the shortcomings of conventional systems. New smart grid devices enable utilities to implement sophisticated demand-response programs. However, utilities are reluctant to undergo significant changes, such as implementing new methods of demand-response management, without significant corroboration of benefit and palpable sense of operation. Utilities would benefit from a system that allowed emulation of smart grid devices so that demand-response programs could be simulated and tested prior to implementation.

Current solutions for simulating demand-response programs in a smart grid comprise servers transmitting control broadcast messages which simply, and indiscriminately, tell virtual smart grid devices to turn themselves off. Current systems do not provide integrated emulation capabilities of virtual smart grid devices in a heterogeneous environment comprising both real and virtual smart grid devices. Current systems also lack control mechanisms and the ability to aggregate smart grid device status information.

Additionally, current systems do not provide privacy protection to end users, and only obtain gross results. Current systems use brute force mechanisms and are unable to determine how many smart grid devices responded to a demand-response control broadcast message.

It would be advantageous to provide a system for emulating the performance of smart grid devices in a smart grid in order to simulate a demand-response program in order to assess the efficacy of such program. It would also be advantageous to provide a system for emulating the performance of smart grid devices in a heterogeneous smart grid consisting of both real smart grid devices and virtual smart grid devices.

It would further be advantageous to provide a system for mass emulation of an arbitrary number of smart grid devices. It would further be advantageous to provide a method of optimizing the accuracy of the virtual mass emulator in a heterogeneous smart grid by including data from real smart grid devices in the virtual mass emulator's feedback loop.

SUMMARY OF THE INVENTION

In accordance with the present invention, there is provided a system and method for emulating smart grid devices in a smart grid for demand-response program analysis and optimization. Smart grid devices may be emulated in a virtual environment on a server, and can also be emulated individually on smart grid devices themselves. Demand-response programs can be simulated in a virtual environment with virtual emulated smart grid devices, or they can be simulated in a hybrid real-virtual environment with both real smart grid devices and virtual emulated smart grid devices. Demand-response programs can be simulated serially or in parallel. Additionally, such hybrid demand-response program simulations can be enhanced and optimized by including data obtained from the real smart grid devices into the simulation feed-back loop.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures. The drawings referred to in this description should be understood as not being drawn to scale except if specifically noted.

DETAILED DESCRIPTION

Before the invention is described in further detail, it is to be understood that the invention is not limited to the particular embodiments described, as such may, of course, vary. It is also to be understood that the terminology used herein is for the purpose of describing particular embodiments only, and not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed with the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, if dates of publication are provided, they may be different from the actual publication dates and may need to be confirmed independently.

Virtual Mass Emulation

Figure 1:
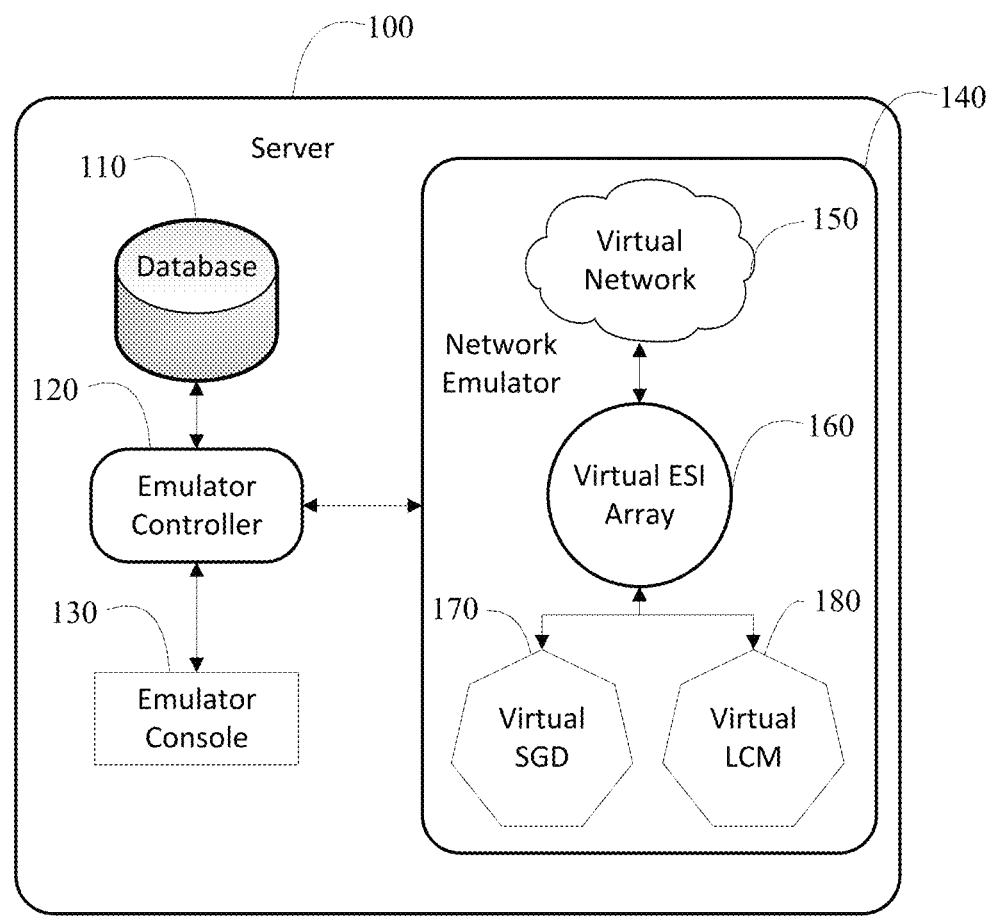
FIG. 1 is a block diagram of various functional components of a smart grid device emulator in accordance with an embodiment of the present invention.

Referring now to FIG. 1, in one embodiment of the invention, the virtual mass emulator 100 comprises a logical unit, which could be distributed across multiple, connected servers or processors, a database 110 of parameters related to a demand-response program simulation, an emulator controller 120 which obtains parameters from the database 110 and displays activities, results, and mock program reports to an user via an emulator console 130, and one or more network emulators 140. The network emulator 140 is created in computer memory and includes a virtual network 150 which represent a Wide Area Network such as the Internet, an advanced metering infrastructure (AMI) network, a data cellular network, or any other network in which a demand-response program operates. The virtual network 150 can contain bandwidth, latency, quality (packet loss, data errors), routing aggregation characteristics, or other network performance and modeling aspects.

One or more arrays of virtual energy services interfaces (ESI) 160 are connected to the virtual network 150 and controlled in a coordinated manner by the emulator controller 120. An ESI generally represents the demarcation point for the energy service provider inside an energy consuming consumer facility. In one embodiment of the present invention, virtual ESIs are represented in the emulator in an array 160 which contains one or more virtual smart grid devices 170, or one or more virtual load control modules 180. A smart grid device is an electrical device such as a hot water heater connected to the energy grid that is capable of participating in demand-response programs. A load control module 180 is an electrical adapter connected to the energy grid that is capable of participating in demand-response programs which provides a connection interface for legacy devices, thereby providing the legacy device with capabilities of a smart grid device. Load control modules are called out herein for illustration purposes, but it should be appreciated that for purposes of the present invention, a load control module is a subset of smart grid devices.

Figure 2:
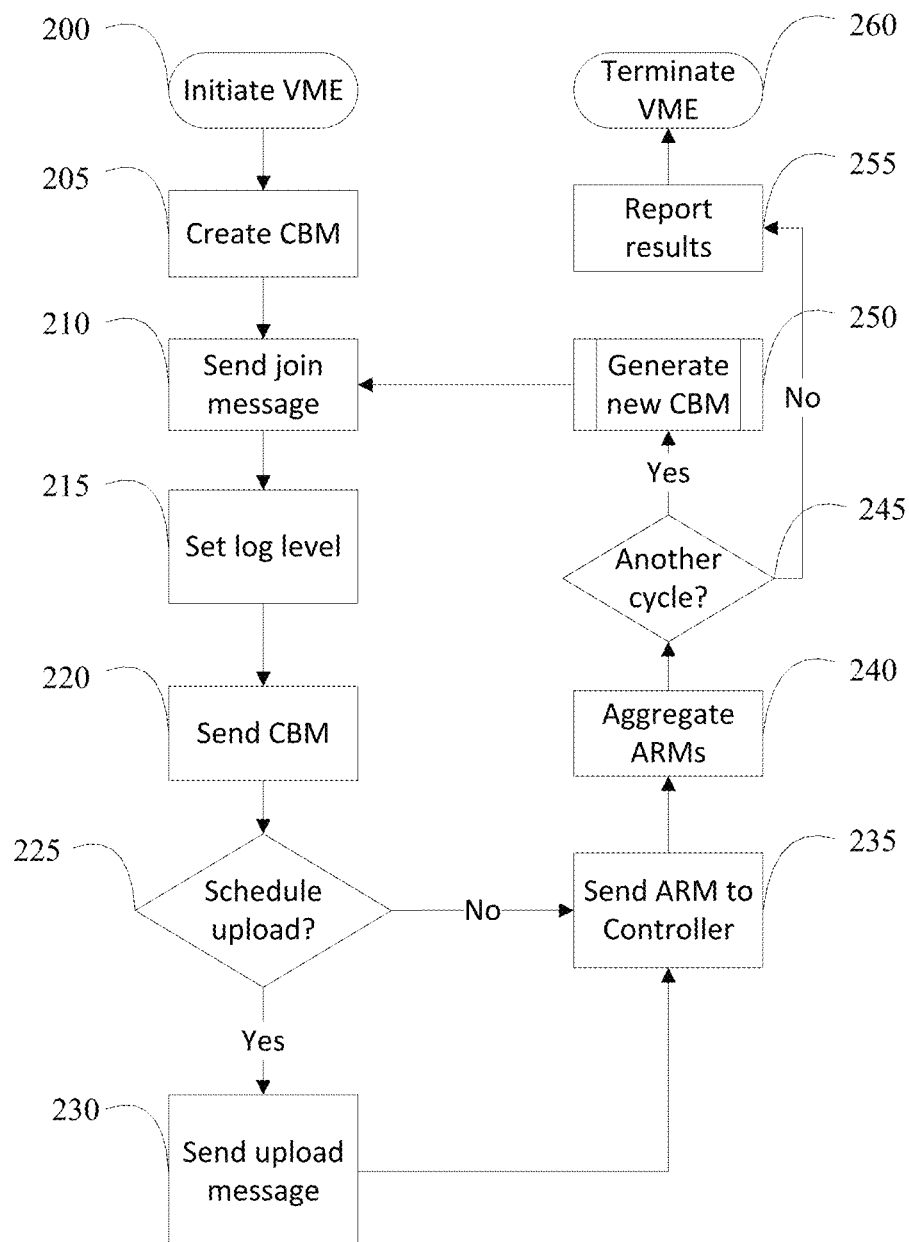
FIG. 2 is a flow chart of a method for emulating a smart grid device in accordance with an embodiment of the present invention.

Referring now to FIG. 2, in one embodiment of the invention, a demand-response program is simulated by the virtual mass emulator initiating a virtual mass emulation instance 200 and instantiating one or more virtual network emulators. The virtual mass emulator creates a control broadcast message 205 containing simulated state and a mock global state target. In an actual demand-response program, the control broadcast message would contain a global state target of energy conservation from a mass population of connected smart grid devices, including load control modules connected to legacy devices. The virtual mass emulator then solicits the virtual emulated smart grid devices to join in the desired mock global state target by transmitting a join message 210. Depending on the parameters of the simulation instantiated, a percentage or all of the virtual emulated smart grid devices will respond. In another embodiment of the invention, join messages may be aggregated for distribution to the virtual emulated smart grid devices. The virtual mass emulator logs the information 215 and then transmits the control broadcast message 220 to all virtual emulated smart grid devices that responded to the join message. The virtual emulated smart grid devices will reply with their individual results in responding to the control broadcast message by reporting directly 225 in an aggregated response message to the emulator controller or scheduling an upload 225 to another device 230 which aggregates individual results into an aggregate response message. Aggregate response messages are then sent to the emulator controller 235, which then further aggregates all aggregate response messages from all smart grid devices reporting directly and all intermediary aggregators reporting on a schedule 240. It should be appreciated that in other embodiments the results can be logged and stored at the virtual emulated smart grid device, and in other embodiments the aggregated response messages can be logged and stored at intermediary aggregators and report on a schedule 240 or in response to a query. If the aggregate of the aggregate response messages indicate that the simulated global state goals have not been achieved 245, then the emulator controller will generate a new control broadcast message 250 start the cycle again by issuing a new join message 210. If virtual global state condition is achieved 245, the emulator controller reports the results 255 and then terminates the virtual mass emulator instance 260.

Virtual Mass Emulation in a Heterogeneous Environment

Figure 3:
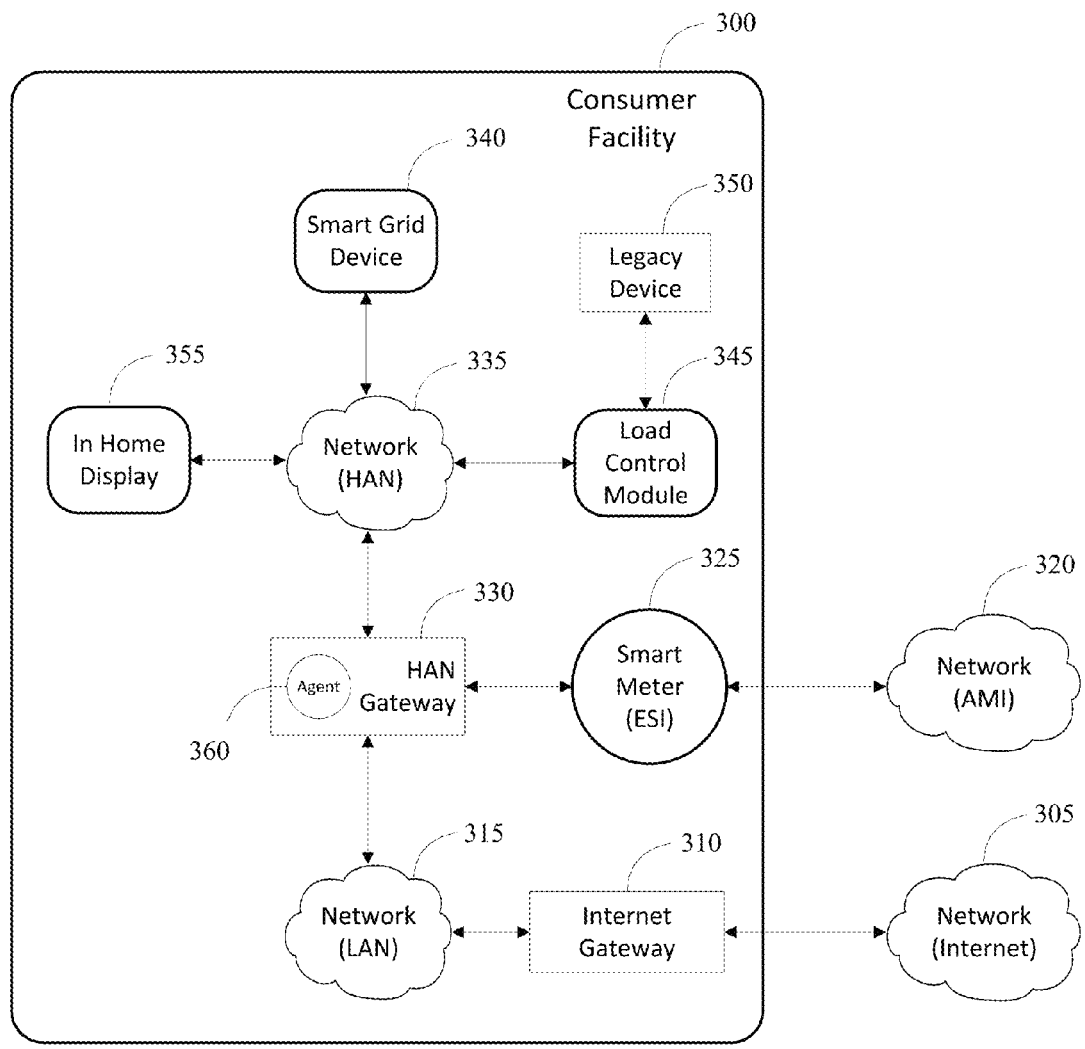
FIG. 3 is a block diagram of various functional components of a demand-response program in a smart grid.

FIG. 3 shows a demand-response event at a consumer facility 300. A consumer facility 300 is designated as an energy consumer, which can be an establishment served by an energy utility, such as a residential home, a commercial establishment, or an industrial plant. An energy utility initiates a demand-response event by transmitting a control broadcast message from its server to the consumer facility 300. The control broadcast message can be transmitted to the consumer facility 300 over the public Internet 305, where the control broadcast message is received by the Internet gateway 310 and routed via the Local Area Network 315 to the Home Area Network gateway 330. Alternatively, the control broadcast message can be transmitted to the consumer facility 300 over another network such as the AMI network 320, where the control broadcast message can be received by the smart meter 325 and routed to the Home Area Network gateway 330.

The Home Area Network gateway 330 routes the control broadcast message over the Home Area Network 335 to smart grid devices 340 and load control modules 345. Smart grid devices 340 will process the received control broadcast message and perform some action, such as modifying its energy consumption. Load control modules 345 will process the received control broadcast message and perform some action such as modifying the energy consumption of an attached legacy device 350. A user at the consumer facility 300 can see the actions performed by the smart grid devices 340 and load control modules 345 represented on the in-home display 355. The in-home display 355 can also provide energy budget information, energy pricing, and other useful information to the user related to the energy management program. The in-home display 355 can also provide the user with the ability to manually override actions performed by smart grid devices 340 or load control modules 345.

After performing an action, including the null set of taking no action, the smart grid devices 340 and load control modules 345 report the energy used pursuant to the curtailment demand in the control broadcast message to a software agent 360. The software agent 360 is embedded in the Home Area Network gateway 330 and comprises algorithms and local side control software to achieve the energy program rules and goals. The software agent 360 returns results of the demand-response event to the utility server that initiated the control broadcast message, another server, or an intermediate aggregation node. The software agent 360 can route the results from the Home Area Network gateway 330 over the Local Area Network 3115 to the Internet gateway 310. The Internet gateway 310 transmits the data over the Internet 305 to the utility server that initiated the control broadcast message, another server, or an intermediate aggregation node. Alternatively, the software agent 360 can route the results from the Home Area Network gateway 330 to the smart meter 325, which transmits the data over the AMI network 320 to the utility server that initiated the control broadcast message, another server, or an intermediate aggregation node.

In another embodiment, software agent 360 is embedded in the smart meter 325. The software agent 360 transmits the results of the demand-response event from the smart meter 325 over the AMI network 320 to the utility server that initiated the control broadcast message, another server, or an intermediate aggregation node.

In another embodiment, software agent 360 is embedded in the Internet gateway 310. The software agent 360 transmits the results of the demand-response event from the Internet gateway 310 over the Internet 305 to the utility server that initiated the control broadcast message, another server, or an intermediate aggregation node.

In another embodiment, software agent 360 is embedded in a smart grid device 340. The software agent 360 transmits the results of the demand-response event from the smart grid device 340 over the Home Area Network 335 to the Home Area Network gateway 330. The Home Area Network gateway 330 routes the data to the smart meter 325 which transmits the data over the AMI network 320 to the utility server that initiated the control broadcast message, another server, or an intermediate aggregation node. Alternatively, the Home Area Network gateway 330 routes the data over the Local Area Network 315 to the Internet gateway 310 which transmits the data over the Internet 305 to the utility server that initiated the control broadcast message, another server, or an intermediate aggregation node.

Figure 4:
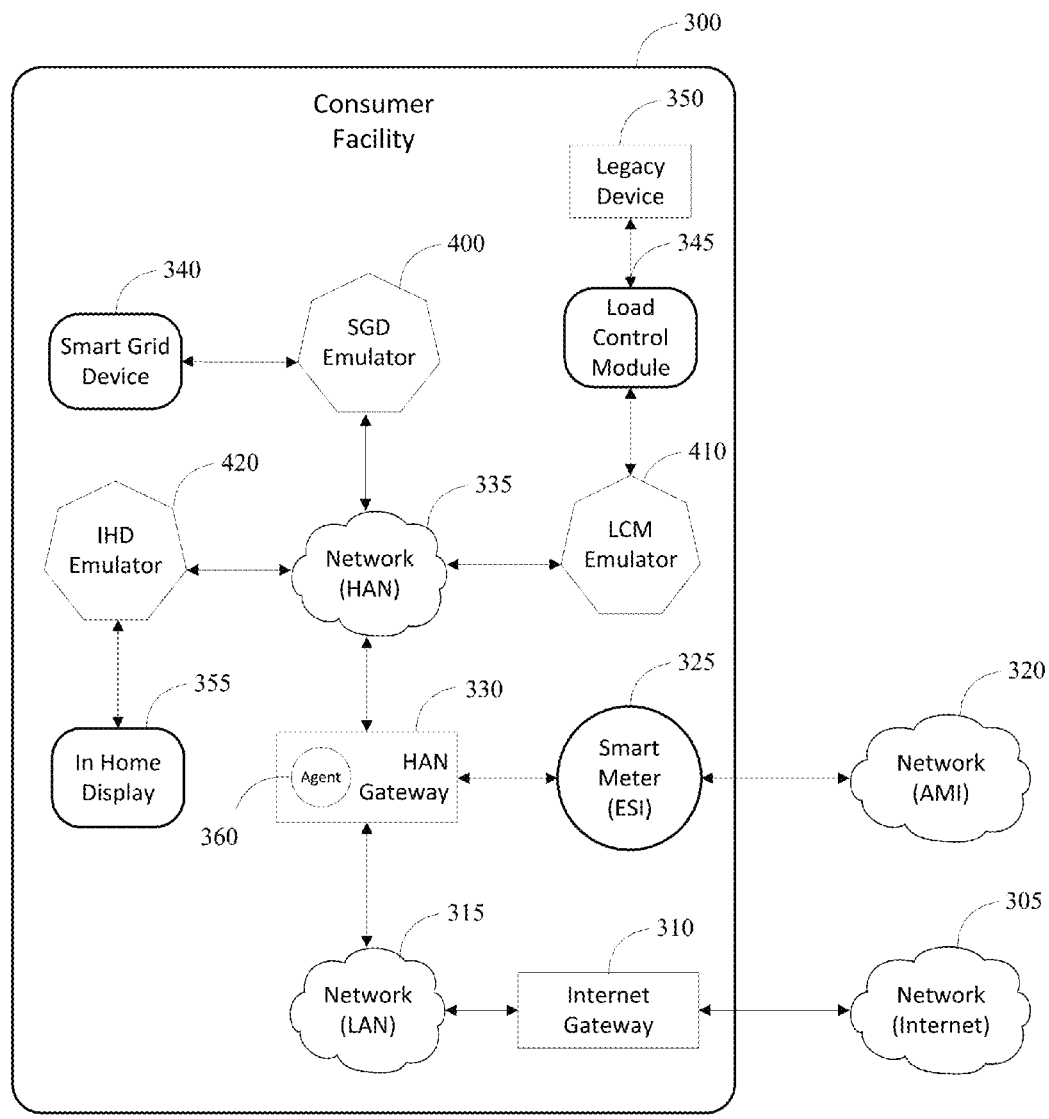
FIG. 4 is a block diagram of various functional components of a smart grid device emulator in accordance with an embodiment of the present invention.
Figure 9:
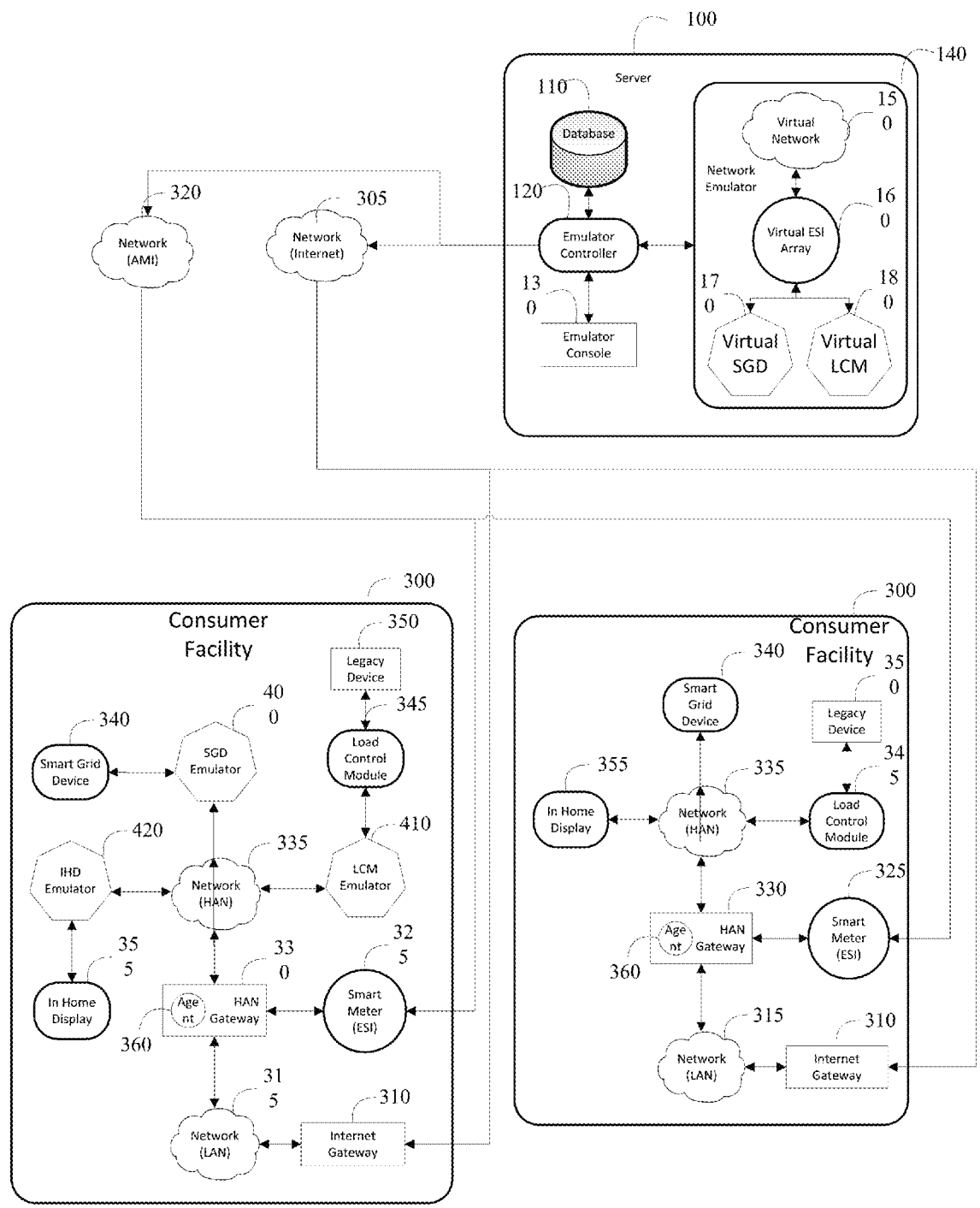
FIG. 9 is a block diagram of various functional components of a smart grid device emulator in accordance with an embodiment of the present invention.

FIG. 4 shows a demand-response event at a consumer facility 300 wherein according to one embodiment of the invention, the demand-response event is generated by a demand-response simulation program and the consumer facility has smart grid device emulation capabilities. A more complete illustration of the system is shown in FIG. 9. A demand-response program simulation initiates a demand-response event by transmitting a control broadcast message from its server to the consumer facility 300. The control broadcast message can be transmitted to the consumer facility 300 over the public Internet 305, where the control broadcast message is received by the Internet gateway 310 and routed over the Local Area Network 315 to the Home Area Network gateway 330.

Alternatively, in another embodiment of the invention, the control broadcast message can be transmitted to the consumer facility 300 over another network such as the AMI network 320, where the control broadcast message can be received by the smart meter 325 and routed to the Home Area Network gateway 330. The Home Area Network gateway 330 routes the control broadcast message over the Home Area Network 335 to smart a grid device emulator 400 and load control module emulator 410. Smart grid device emulator 400 processes the received control broadcast message and simulates some action, such as modifying its energy consumption. Load control module emulator 410 processes the received control broadcast message and simulates some action, such as modifying the energy consumption of a legacy device 350 attached to a load control module 345. The load control module 345 has a logical emulator related to the legacy device 350 that will virtually turn off or otherwise adjust the energy-consumption as part of the demand-response program simulation. The in-home display emulator 420 can also simulate manual override actions directed to smart grid device 340 or load control module 345.

After simulating an action, including the null set of taking no action, the smart grid device emulator 400 and load control module emulator 410 report the simulated energy used pursuant to the curtailment of demand in the control broadcast message to a software agent 360. The software agent 360 is embedded in the Home Area Network gateway 330 and comprises algorithms and local side control software to achieve the energy program rules and goals. The software agent 360 can route the results from the Home Area Network gateway 330 over the Local Area Network 315 to the Internet gateway 310. The Internet gateway 310 transmits the data over the Internet 305 to the demand-response program simulation that initiated the control broadcast message, another server, or an intermediate aggregation node. In another embodiment of the invention, the software agent 360 can route the results from the Home Area Network gateway 330 to the smart meter 325, which transmits the data over the AMI Network 320 to the demand-response program simulation that initiated the control broadcast message, another server, or an intermediate aggregation node. Although the actions of the smart grid devices 340 and load control modules 345 are simulated, the demands and the responses in a demand-response program simulation are routed over real-world network topologies, thus providing valuable network validation and program performance estimation information for electric utility technical personnel.

In another embodiment of the invention, software agent 360 is embedded in the smart meter 325. The software agent 360 transmits the results of the demand-response event from the smart meter 325 over the AMI network 320 to the utility server that initiated the control broadcast message, another server, or an intermediate aggregation node.

In another embodiment of the invention, software agent 360 is embedded in the Internet gateway 310. The software agent 360 transmits the results of the demand-response event from the Internet gateway 310 over the Internet 305 to the utility server that initiated the control broadcast message, another server, or an intermediate aggregation node.

In another embodiment of the invention, software agent 360 is embedded in a smart grid device 340. The software agent 360 transmits the results of the demand-response event from the smart grid device 340 over the Home Area Network 335 to the Home Area Network gateway 330. The Home Area Network gateway 330 can route the data to the smart meter 325 which transmits the data over the AMI network 320 to the utility server that initiated the control broadcast message, another server, or an intermediate aggregation node. Alternatively, the Home Area Network gateway 330 routes the data over the Local Area Network 315 to the Internet gateway 310 which transmits the data over the Internet 305 to the utility server that initiated the control broadcast message, another server, or an intermediate aggregation node.

Figure 5:
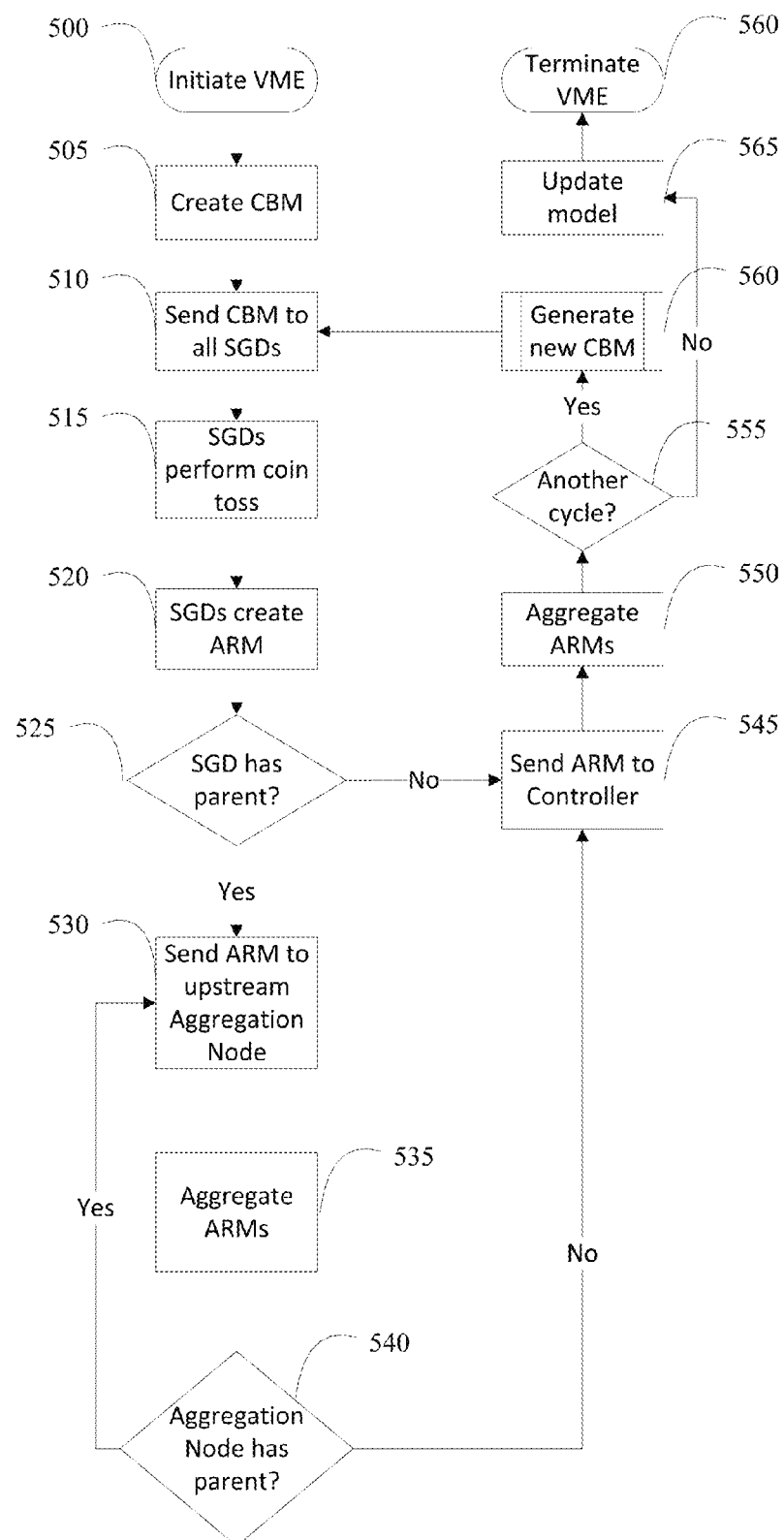
FIG. 5 is a flow chart of a method for emulating a smart grid device in accordance with an embodiment of the present invention.

Referring now to FIG. 5, according to an embodiment of the invention, a demand-response program is simulated by the virtual mass emulator initiating a virtual mass emulation instance 500 and instantiating one or more virtual network emulators. The virtual mass emulator creates a control broadcast message 505 containing simulated state and a mock global state target. In an actual demand-response program, the control broadcast message would contain a global state target of energy conservation from a mass population of connected smart grid devices, including load control modules connected to legacy devices. The virtual mass emulator then transmits the control broadcast message 510 to all virtual emulated smart grid devices. The virtual emulated smart grid devices will process the control broadcast message by performing a random generation and emulation of an action 515, and will reply with individual results in responding to the control broadcast message by reporting in an aggregated response message 520.

The virtual emulated smart grid device will then determine where to transmit the aggregated response message. If the smart grid device does not have a parent in the hierarchy 525, the smart grid device will transmit the aggregated response message directly to the emulator controller 545, otherwise the smart grid device will transmit the aggregated response message up the hierarchy to an aggregation node 530. The aggregation node will aggregated all aggregated response messages received and will then determine where to send updated aggregated response message 540. If the aggregation node itself has a parent, the aggregation node will transmit the updated aggregated response message to that parent aggregation node 530, otherwise the aggregation node will transmit the updated aggregated response message to the emulator controller 545. The emulator controller 550 then further aggregates all aggregate response messages from all smart grid devices reporting directly and all intermediary aggregation nodes. In one embodiment of the invention, if the aggregate of the aggregated response messages indicate that the simulated global state goals have not been achieved 555, then the emulator controller will generate a new control broadcast message 560 and start the cycle again by transmitting the new control broadcast message 510. If virtual global state condition is achieved 555, the model is updated 565 and then the virtual mass emulator instance 570 is terminated. It should be appreciated that multiple instances can be run serially or in parallel. In some instances, the cycles will run continuously the simulated global state goals 555 will not be evaluated such that the emulator controller will generate a new control broadcast message 560 and start the cycle again by transmitting the new control broadcast message 510. It will be appreciated that many other variables can control whether the cycle repeats, either in serial or in parallel, including passage of time, number of cycles completed, and results of other serial or parallel simulations.

Figure 6:
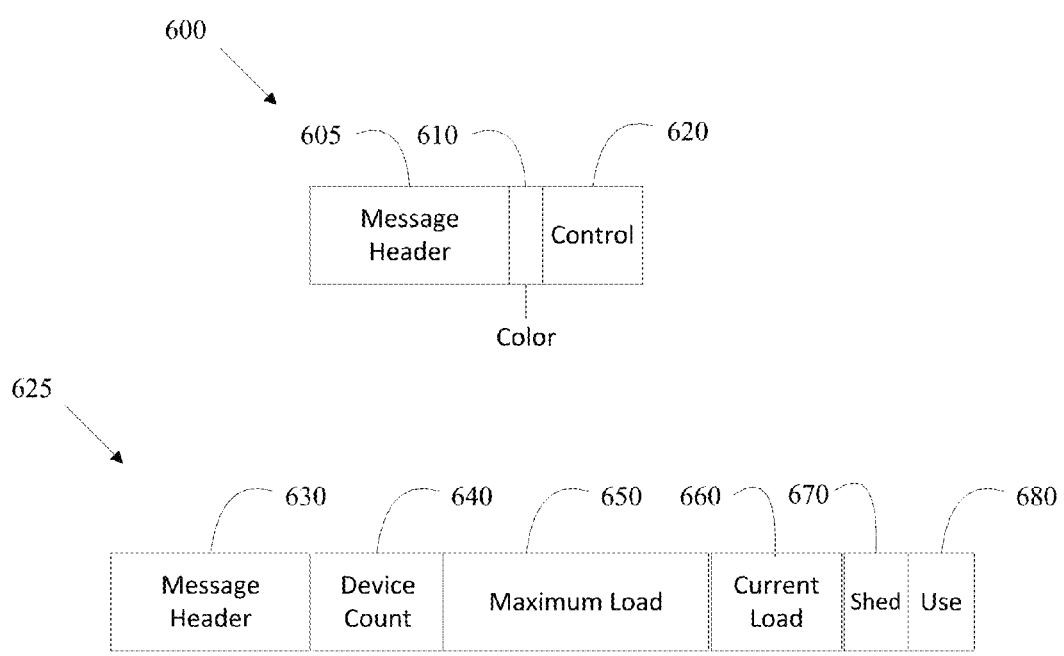
FIG. 6 is a block diagram of various functional components of a control broadcast message in accordance with an embodiment of the present invention.

Referring now to FIG. 6, in one embodiment of the invention, a control broadcast message 600 is shown as a data structure comprising three fields: the message header 605 field, color 610 field and control 620 field. However, it should be appreciated that other data could be used, or more data could be added to a control broadcast message 600, including specific manufacturer device tags and broadcast method.

Most utilities have some form of private communications network, often based on narrow bands of radio frequency (RF) communications, powerline (PLC), or sometimes both. Radio frequency (RF) has useful characteristics of low-latency and signal distance, and PLC utilizes current infrastructure, but both usually lack the bandwidth and sophistication of typical telecommunication packet network communication. The control broadcast messages 600 and aggregated response messages 625 have the inherent ability to be configured for a very short, consistent message size, thus making network architecture, demand side management (DSM) program expansion, and daily information technology (IT) operations more reliable, simple, and affordable.

In one embodiment of the invention, the message header 605 field contains bookkeeping data such as a timestamp, any persistent configuration flags, and message type. The color 610 field contains information about the set of consumer facilities and smart grid devices that should process the control broadcast message 600. The control 620 field contains a control signal that is derived from the global state of the system. The color 610 field and control 620 field may vary in data type and size depending on the particular control outcome that is desired.

In one embodiment of the invention, the emulator controller algorithm groups smart grid devices according to color. The color of a device represents its demand flexibility. For example, in a four-color system (which is the typical use case), green devices will turn off before yellow devices, which will turn off before red devices. Black devices are not flexible at all and are never turned off. The control broadcast message 600 can be set at 10 bytes long, no matter how many colors are in use.

Referring now to the bottom of FIG. 6, according to one embodiment of the invention, an aggregated response message 625 is shown as a data structure comprising of six fields. The response message header 630 field which contains bookkeeping data such as a timestamp, any persistent configuration flags, and message type, as well as aggregate information about the global state of the network that has been aggregated in a particular network path or tree, through a number of different channels such as a Home Area. Network, a smart grid device, internet gateway, or other wired or wireless network compliant with this messaging protocol. The device count 640 field represents a rolling estimate of the number of devices covered in a particular aggregation tree. The device may refer to any type of network node, including consumer facility, smart grid device, Home Area Network gateway, and Internet gateway. The maximum load 650 field contains the estimated maximum possible power that can be instantaneously consumed by all the network nodes or smart grid devices in a particular aggregation tree. The current load 670 field contains the estimated aggregate power that is being currently consumed by all the network nodes or smart grid devices in a particular aggregation tree. The shed 670 field and use 680 field contain the estimated additional power in aggregate at that time tithe which can be reduced or consumed pith the help of all the network nodes in a particular aggregation tree. It should be appreciated that all fields in the aggregated response message can have estimates broken down by the color 610 or device class otherwise specified in the configuration of the system.

It should be appreciated that the format and size requirements for control broadcast messages 600 and aggregated response messages 625 are consistently small, and the fact that the control broadcast messages 600 and aggregated response messages 625 are a constant size assists network planners in building more reliable systems.

In one embodiment of the invention, the size of the aggregated response message 625 depends on the number of colors in use. For example, a four-color system requires a 42-byte aggregated response message size, whereas a minimal two-color system requires only 22 bytes. Once defined for a utility, every "wave" of aggregated response messages 625 has the same consistently small packet size.

Aggregated response messages 625 are generally larger than control broadcast messages 600 in part because the system is optimized for minimal downstream payload size for curtailment reaction speed and improvement of system reliability on challenged AMI networks. It should be appreciated that the size of the control broadcast messages 600 and aggregated response messages 625 could be slightly increased by adding extra protocol functionality like Universal Smart Network Access Port (USNAP) (4B), smart energy profile (SEP) (4B), checksum(4-32B).

Figure 7:
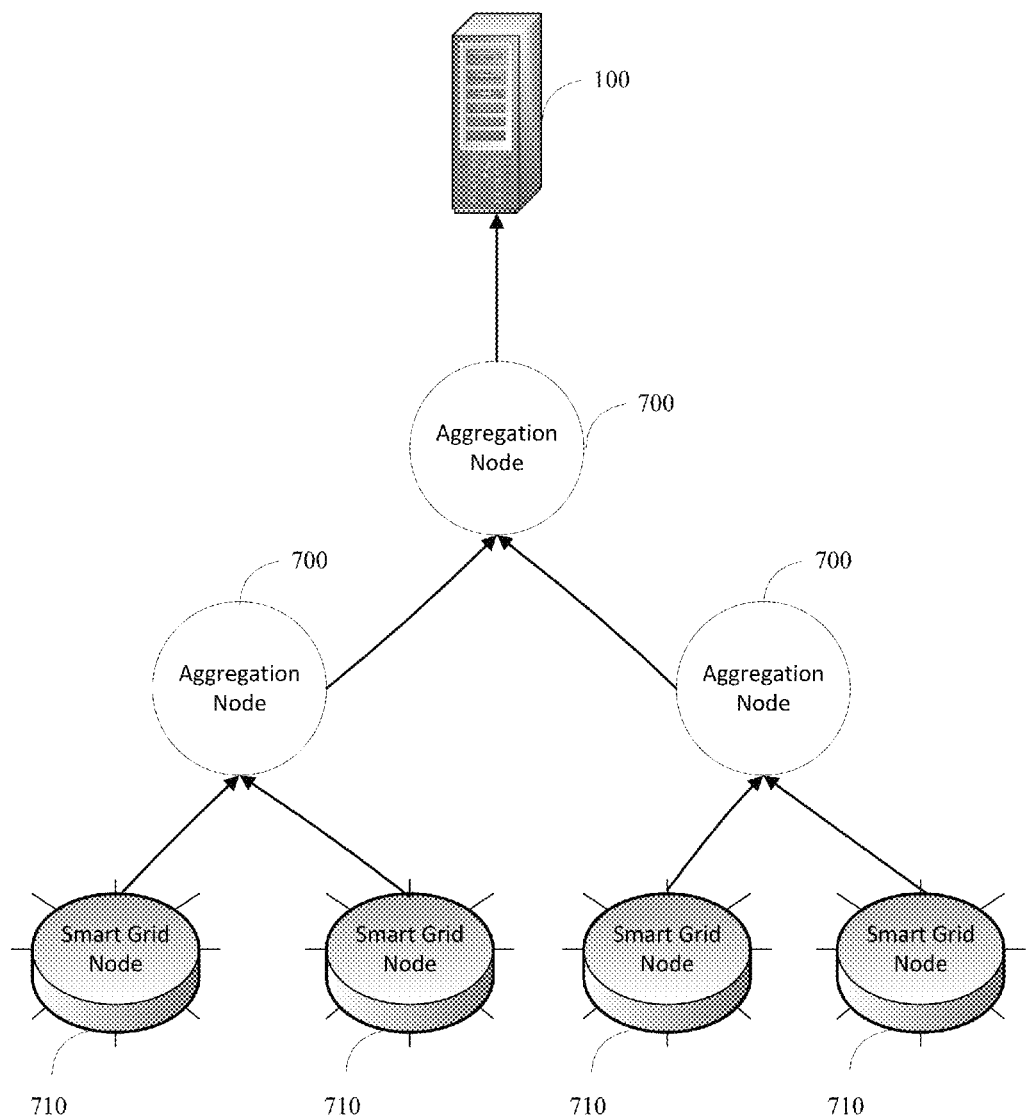
FIG. 7 is a block diagram of various functional components of a smart grid device status aggregator in accordance with an embodiment of the present invention.

Referring to FIG. 7, it should be appreciated that some aggregated response messages may come from many different sources indicated as smart grid nodes 710, which can be an actual smart grid device, an energy gateway device or a smart meter in consumer facility. The aggregated response message represents the complete system state of all smart grid devices known by the particular smart grid node 710 or aggregation node 700 and all smart grid devices below it in the hierarchy. In one embodiment of the invention, the aggregated response message is transmitted from smart grid nodes 710 up the control chain, eventually to be consolidated by the virtual mass emulator 100. The aggregated response message may be transmitted directly to the virtual mass emulator 100, but more likely will be transmitted to layers of aggregation nodes 700 which will merge, consolidate, and transmit the data up the hierarchy. Any other smart grid device, network node or server which is the recipient of an aggregated response message can merge it with all other system state information known by that device into a modified aggregated response message which can then be sent up the chain of control. The final end point for the aggregated response messages is the emulator controller, which in turn can use the data to compute and send out a new control broadcast message 600.

Example Computing System

Figure 8:
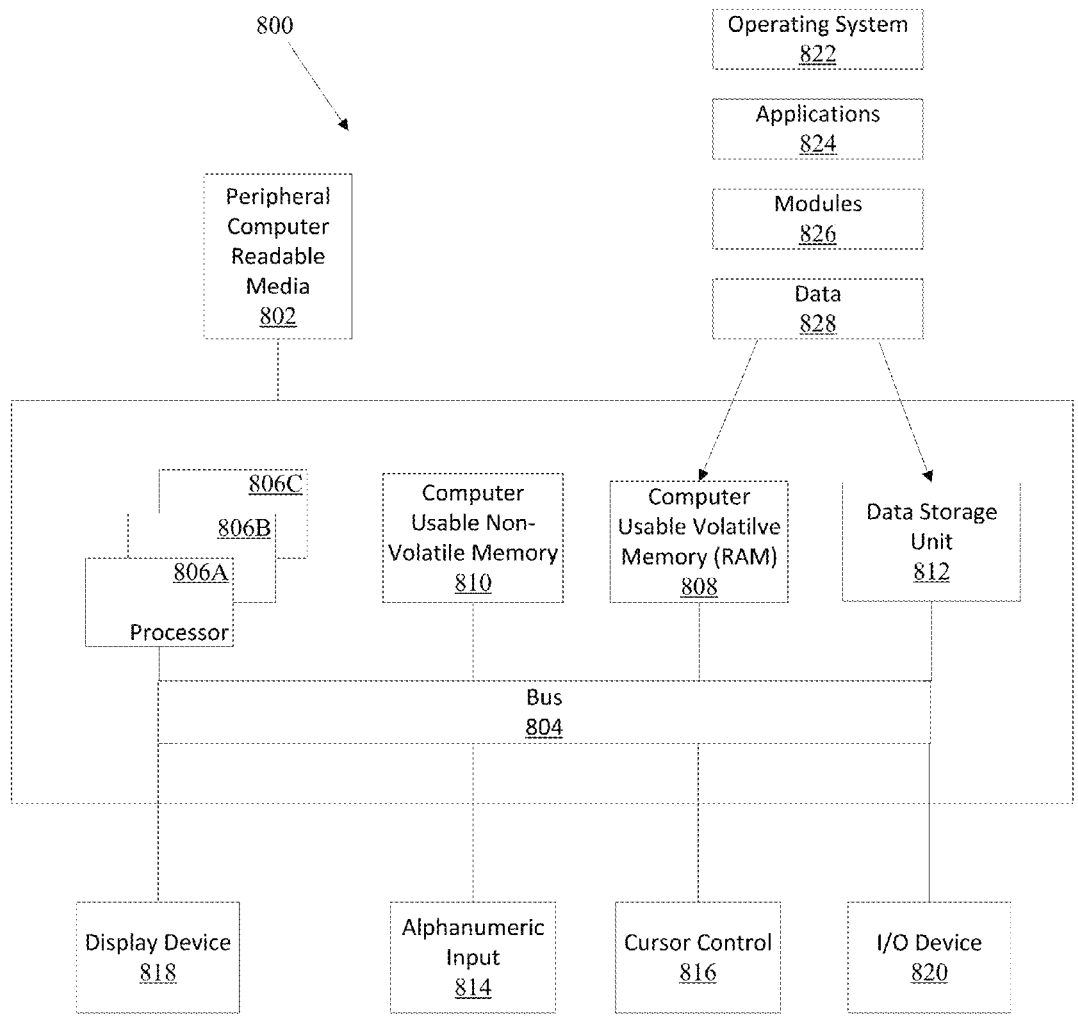
FIG. 8 is a block diagram of an exemplary computer system in accordance with one embodiment of the present invention.

With reference now to FIG. 8, portions of the technology for providing computer-readable and computer-executable instructions that reside, for example, in or on computer-usable media of a computer system. That is, FIG. 8 illustrates one example of a type of computer that can be used to implement one embodiment of the present technology.

Although computer system 800 of FIG. 8 is an example of one embodiment, the present technology is well suited for operation on or with a number of different computer systems including general purpose networked computer systems, embedded computer systems, routers, switches, server devices, user devices, various intermediate devices/artifacts, standalone computer systems, mobile phones, personal data assistants, and the like.

In one embodiment, computer system 800 of FIG. 8 includes peripheral computer readable media 802 such as, for example, a floppy disk, a compact disc, and the like coupled thereto.

Computer system 800 of FIG. 8 also includes an address/data bus 804 for communicating information, and a processor 806A coupled to bus 804 for processing information and instructions. In one embodiment, computer system 800 includes a multi-processor environment in which a plurality of processors 806A, 806B, and 806C are present. Conversely, computer system 800 is also well suited to having a single processor such as, for example, processor 806A. Processors 806A, 806B, and 806C may be any of various types of microprocessors. Computer system 800 also includes data storage features such as a computer usable volatile memory 808, e.g. random access memory (RAM), coupled to bus 804 for storing information and instructions for processors 806A, 806B, and 806C.

Computer system 800 also includes computer usable non-volatile memory 810, e.g. read only memory (ROM), coupled to bus 804 for storing static information and instructions for processors 806A, 806B, and 806C. Also present in computer system 800 is a data storage unit 812 (e.g., a magnetic or optical disk and disk drive) coupled to bus 804 for storing information and instructions. Computer system 800 also includes an optional alpha-numeric input device 814 including alpha-numeric and function keys coupled to bus 804 for communicating information and command selections to processor 806A or processors 806A, 806B, and 806C. Computer system 800 also includes an optional cursor control device 816 coupled to bus 804 for communicating user input information and command selections to processor 806A or processors 806A, 806B, and 806C. In one embodiment, an optional display device 818 is coupled to bus 804 for displaying information.

Referring still to FIG. 8, optional display device 818 of FIG. 8 may be a liquid crystal device, cathode ray tube, plasma display device or other display device suitable for creating graphic images and alpha-numeric characters recognizable to a user. Optional cursor control device 816 allows the computer user to dynamically signal the movement of a visible symbol (cursor) on a display screen of display device 818. Implementations of cursor control device 816 include a trackball, mouse, touch pad, joystick or special keys on alpha-numeric input device 814 capable of signaling movement of a given direction or manner of displacement. Alternatively, in one embodiment, the cursor can be directed and/or activated via input from alpha-numeric input device 814 using special keys and key sequence commands or other means such as, for example, voice commands.

Computer system 800 also includes an I/O device 820 for coupling computer system 800 with external entities. In one embodiment, I/O device 820 is a modem for enabling wired or wireless communications between computer system 800 and an external network such as, but not limited to, the Internet. Referring still to FIG. 8, various other components are depicted for computer system 800. Specifically, when present, an operating system 822, applications 824, modules 826, and data 828 are shown as typically residing in one or some combination of computer usable volatile memory 808, e.g. random access memory (RAM), and data storage unit 812. However, in an alternate embodiment, operating system 822 may be stored in another location such as on a network or on a flash drive. Further, operating system 822 may be accessed from a remote location via, for example, a coupling to the internet. In one embodiment, the present technology is stored as an application 824 or module 826 in memory locations within RAM 808 and memory areas within data storage unit 812.

The present technology may be described in the general context of computer-executable instructions stored on computer readable medium that may be executed by a computer. However, one embodiment of the present technology may also utilize a distributed computing environment where tasks are performed remotely by devices linked through a communications network.

It should be further understood that the examples and embodiments pertaining to the systems and methods disclosed herein are not meant to limit the possible implementations of the present technology. Further, although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the Claims.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system for performing demand-response program simulations, said system comprising:
   a database containing a plurality of parameters related to a demand-response program simulation;
   an emulator controller instantiating at least one network emulator capable of receiving a control broadcast message based on said parameters obtained from said database;
   a plurality of emulated smart grid devices, wherein each said network emulator emulates a network interfacing with said emulated smart grid device capable of receiving, processing and responding to said control broadcast message;
   at least one non-emulated smart grid device located at a consumer facility, wherein at least one of said at least one non-emulated smart grid device hosts, and is communicatively connected with, one of said emulated smart grid devices and at least one of said at least one non-emulated smart grid device is communicatively connected to said emulator controller over a non-emulated network.

2. The system of claim 1, wherein said non-emulated network comprises the public Internet.

3. The system of claim 1, wherein said non-emulated network comprises an Advanced Metering Itrastructure (AMI) network.

4. The system of claim 1, further comprising a software agent located at said consumer facility wherein
   a. said software agent is communicatively connected to said emulator controller over said non-emulated network; and wherein
   b. said software agent is communicatively connected to each said at least one non-emulated smart grid device; and wherein
   c. said software agent mediates distribution of said control broadcast message to each said at least one non-emulated smart grid device; and wherein
   d. said software agent receives a response to said control broadcast message from each said at least one non-emulated smart grid device and transmits an aggregated response message to said emulator controller over said non-emulated network.

5. The system of claim 4, wherein said software agent is hosted in a Home Area Network gateway, an Internet gateway, a smart meter, or one of said at least one non-emulate smart grid device.

6. The system of claim 4, wherein said software agent is communicatively connected to each said non-emulated smart grid device over a Home Area Network.

7. The system of claim 4, further comprising at least one non-emulating smart grid device wherein
   a. said non-emulating smart grid device does not host said at least one emulated smart grid device; and wherein
   b. each said non-emulating smart grid device is communicatively connected to said software agent; and wherein c. said software agent mediates distribution of said control broadcast message to said at least one emulated smart grid device and said at least one non-emulating smart grid device; and wherein d. said software agent receives a response to said control broadcast message from said at least one emulated smart grid device and said at least one non-emulating smart grid device and transmits an aggregated response message to said emulator controller over said non-emulated network.

8. The system of claim 1, further comprising at least one aggregation node wherein a. said aggregation node is communicatively connected to more than one of said smart grid devices; and wherein b. said aggregation node is communicatively connected to said emulation controller; and wherein c. said aggregation node receives responses to said control broadcast message from more than one of said emulated smart grid devices; and wherein d. said aggregation node aggregates said responses from said emulated smart grid devices into a single aggregation response message; and wherein e. said aggregation node transmits said aggregation response message to said emulation controller.

9. The system of claim 8, further comprising at least one upstream aggregation node wherein a. said at least one upstream aggregation node is communicatively connected to said at least one aggregation node and said at least one additional aggregation node; and wherein b. said at least one upstream aggregation node is communicatively connected to either said emulation controller or a secondary upstream aggregation node; and wherein c. said upstream aggregation node receives said aggregated response message from said at least one aggregation node and said at least one additional aggregation nodes; and wherein d. said upstream aggregation node further aggregates said aggregated response messages from said at least one aggregation node and said at least one additional aggregation node; and wherein e. said at least one upstream aggregation node transmits said aggregation response message to said emulation controller or to said secondary upstream aggregation node.

10. A method for emulating a plurality of smart grid devices in a smart energy grid, said method comprising:

receiving a plurality of parameters related to a demand-response program simulation;

creating a control broadcast message based on said parameters in an emulator controller;

emulating one or a plurality of networks capable of receiving said control broadcast message;

emulating at least one of said smart grid devices capable of receiving, processing and responding to said control broadcast message, said at least one emulated smart grid devices communicatively connected to one of said emulated networks;

transmitting from said emulator controller said control broadcast message to said at least one emulated smart grid devices over said at least one emulated network wherein said at least one emulated smart grid devices receive said control broadcast message, emulating an action based thereon, and returning a response message from said at least one emulated smart grid device; p1 transmitting said control broadcast message to at least one no-emulated smart grid device located at a consumer facility over a non-emulated network wherein said at least one non-emulated smart grid device hosts, and is communicatively connected with, one of said emulated smart grid devices and receiving said control broadcast message, emulating an action based thereon, and returning a response message from said at least one non-emulated smart grid device; and receiving said response message from said at least one emulated smart grid device and said response message from said at least one non-emulated smart grid device and determining a result.

11. The method of claim 10, further comprising transmitting said control broadcast message over a non-emulated network to a software agent located at a consumer facility wherein said software agent distributes said control broadcast message to more than one non-emulated smart grid device located at said consumer facility hosting one of said emulated smart grid devices, receives said response message from each said non-emulated smart grid device, combines each said response message into an aggregated response message, and transmits said aggregated response message to said emulator controller.

12. The method of claim 11, further comprising said software agent distributing said control broadcast message to at least one non-emulating smart grid device not hosting one of said emulated smart grid device located at said consumer facility, receiving a response message from said at least one non-emulating smart grid device, combining said response message of said at least one non-emulating smart grid device and said response of said at least one emulated smart grid device into said aggregated response message, and transmitting said aggregated response message to said emulator controller.

13. The method of claim 12, further comprising evaluating and comparing said response message of said non-emulating smart grid devices to said response messages of said emulated smart grid devices in order to optimize said parameters related to said demand-response program simulation.

14. The method of claim 11, further comprising transmitting said aggregated response messages from a plurality of said software agents to an aggregation node, wherein said aggregation node combines said aggregated response messages from said plurality of said software agents and transmits a further aggregated response message to said emulator controller.

15. The method of claim 11, further comprising transmitting a plurality of said further aggregated response messages from a plurality of said aggregation nodes to an upstream aggregation node, wherein said upstream aggregation node combines said plurality of said further aggregated response messages and transmits a secondarily aggregated response message to another upstream aggregation node.

16. The method of claim 10, further comprising evaluating said result to determine compliance with said parameters related to said demand-response program simulation, and if said results are not in compliance, generating a new control broadcast message.

17. A non-transitory computer readable medium storing programming instructions for emulating a plurality of smart grid devices in a smart energy grid, the non-transitory computer readable medium comprising:

programming instructions for receiving a plurality of parameters related to a demand-response program simulation;

programming instructions for creating a control broadcast message based on said parameters in an emulator controller;

programming instructions for emulating one or a plurality of networks capable of receiving said control broadcast message;

programming instructions for emulating one or a plurality of smart grid devices capable of receiving, processing and responding to said control broadcast message, said emulated smart grid devices communicatively connected to one of said emulated networks;

programming instructions for transmitting from said emulator controller said control broadcast message to said emulator smart grid devices over said emulated network wherein said emulator smart grid devices receive said control broadcast message, emulate an action based thereon, and return in a response message of said emulated smart grid devices;

programming instructions for transmitting said control broadcast message to at least one non-emulated smart grid device located at a consumer facility over a non-emulated network wherein said at least one non-emulated smart grid device hosts one of said emulated smart grid devices, receiving said control broadcast message, emulating an action based thereon, and returning a response message of said at least one non-emulated smart grid device; and programming instructions for receiving said response message from said emulated smart grid devices and said response message from said at least one non-emulated smart grid device and determining a result.

18. The non-transitory computer readable medium as recited in claim 17, further comprising programming instructions for transmitting said control broadcast message over said non-emulated network to a software agent located at a consumer facility wherein said software agent distributes said control broadcast message to more than one non-emulated smart grid device located at said consumer facility hosting one of said emulated smart grid devices, receives said response message from each said non-emulated smart grid device, combines each said response message into an aggregated response message, and transmits said aggregated response message to said emulator controller.

19. The non-transitory computer readable medium as recited in claim 18, further comprising programming instructions for said software agent distributing said control broadcast message to at least one non-emulating smart grid device not hosting one of said emulated smart grid devices located at said consumer facility, receiving a response message from said at least one non-emulating smart grid device, combining said response messages of said at least one non-emulating smart grid device and said response of said at least one non-emulated smart grid device into said aggregated response message, and transmitting said aggregated response message to said emulator controller.

20. The non-transitory computer readable medium as recited in claim 19, further comprising programming instructions for evaluating and comparing said response message of said non-emulating smart grid device to said each response message of said emulated smart grid devices in order to optimize said parameters related to said demand-response program simulation.

21. The non-transitory computer readable medium as recited in claim of claim 18, further comprising programming instructions for transmitting said aggregated response messages from a plurality of said software agents to an aggregation node, wherein said aggregation node combines said aggregated response messages from said plurality of said software agents and transmits a further aggregated response message to said emulator controller.

22. The non-transitory computer readable medium as recited in claim 18, further comprising programming instructions for transmitting a plurality of further aggregated response messages from a plurality of said aggregation nodes to an upstream aggregation node, wherein said upstream aggregation node combines said plurality of said further aggregated response messages and transmits a secondarily aggregated response message to another upstream aggregation node.

23. The non-transitory computer readable medium as recited in claim 17, further comprising programming instructions for evaluating said result to determine compliance with said parameters related to said demand-response program simulation, and if said results are not in compliance, generating a new control broadcast message.

* * * * *